United States Patent
Zeck et al.

(10) Patent No.: US 6,731,814 B2
(45) Date of Patent: May 4, 2004

(54) METHOD FOR COMPRESSING DIGITAL DOCUMENTS WITH CONTROL OF IMAGE QUALITY AND COMPRESSION RATE

(75) Inventors: Norman W. Zeck, Webster, NY (US); Peter A. Crean, Penfield, NY (US); Sang-Chul Kang, Irvine, CA (US); David E. Rumph, Pasadena, CA (US); George L. Eldridge, Long Beach, CA (US); William E. Nelson, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 604 days.

(21) Appl. No.: 09/727,824

(22) Filed: Dec. 4, 2000

(65) Prior Publication Data

US 2001/0031092 A1 Oct. 18, 2001

Related U.S. Application Data

(60) Provisional application No. 60/201,231, filed on May 1, 2000.

(51) Int. Cl.[7] ................................................ G06K 9/36
(52) U.S. Cl. ...................... 382/239; 382/176; 382/224; 382/233; 341/51; 358/426.02
(58) Field of Search ................................ 382/173, 176, 382/224, 232, 233, 239, 244; 341/51; 348/404.2; 358/426.02

(56) References Cited

U.S. PATENT DOCUMENTS

| | | | |
|---|---|---|---|
| 5,225,911 A | 7/1993 | Buckley et al. | 358/296 |
| 5,479,587 A | 12/1995 | Campbell et al. | 395/116 |
| 5,539,842 A | 7/1996 | Schwartz | 382/232 |
| 5,638,498 A * | 6/1997 | Tyler et al. | 358/1.18 |
| 5,778,092 A * | 7/1998 | MacLeod et al. | 382/176 |
| 5,982,937 A | 11/1999 | Accad | 382/239 |
| 6,272,255 B2 * | 8/2001 | de Queiroz et al. | 382/239 |
| 6,324,305 B1 * | 11/2001 | Holladay et al. | 382/239 |
| 6,373,981 B1 * | 4/2002 | de Queiroz et al. | 382/176 |

FOREIGN PATENT DOCUMENTS

| | | |
|---|---|---|
| EP | 0 585 524 A1 | 3/1994 |
| EP | 0 597 571 A2 | 5/1994 |
| WO | WO 96/41308 | 12/1996 |

OTHER PUBLICATIONS

Stearns, et al. "Lossless coding and compression of mixed data types", IEEE, pp. 1451–1454, 1998.*

* cited by examiner

*Primary Examiner*—Daniel Mariam

(57) ABSTRACT

A method and apparatus for compressing and decompressing electronic documents, with maximum intradocument independence, and maximum flexibility in optimization of compression modes. The method includes receiving documents containing unknown combinations of a plural data types, including combinations of scanned data, computer rendered data, compressed data and/or rendering tags; dividing the received image into strips of blocks determining from the image itself, which data types are present in each block; compressing data of each data type present in each block with a compression method optimized for its data type. Scanned data may be further segmented into plural scanned data types, where each data type is compressed in said compressing data step with a compression method optimized for said scanned image data type. If the received data type is compressed data, the process may include the additional functions of determining a compression ratio thereof, and accepting the compressed data for use as, or decompressing and recompressing the data, based on acceptability of said compression ration determination. An instruction set is generated that allows detailed decompression instruction data and image data to be combined with transmitted compressed data. A data structure is shown, which segregates data types and instruction data, and allows for block to block and strip to strip processing independence.

4 Claims, 6 Drawing Sheets

METHOD FOR COMPRESSING DIGITAL DOCUMENTS WITH CONTROL OF IMAGE QUALITY AND COMPRESSION RATE

This application is based on a provisional application No. 60/201,231, filed May 1, 2000.

In digital systems image format documents are often compressed to save storage costs or to reduce transmission time through a transmission channel. Lossless compression can be applied to these documents that can achieve very good compression on regions of the document that are computer rendered such as characters and graphics. However, areas of the document that contain scanned image data will not compress well. Compression technologies such as JPEG can be applied to the document that will work well on scanned, continuous tone, areas of the document. Image quality problems arise with this compression technology, and transform-coding technologies in general, with high contrast edges that are produced by computer rendered objects. The solution to this problem is to apply different compression technologies to the document to optimize image quality and compressibility.

A method for digital image compression of a raster image is disclosed which uses different compression methods for selected parts of the image and which adjusts the compression and segmentation parameters to control the tradeoff of image quality and compression. The image, including rendering tags that can accompany each pixel, is encoded into a single data stream for efficient handling by disk, memory and I/O systems. The uniqueness of this system is in the content-dependent separation of the image into lossy and lossless regimes, the transmission of only those blocks containing information, and the adjustable segmentation and compression parameters used to control the image data rate compression rate) averaged over extremely small intervals (typically eight scan lines).

The graphics arts world, and Scitex in particular, as exemplified in the TIFF/IT standard (ISO12639:1997E, "Graphic Technology Prepress Digital Data Exchange Tag Image File Format for Image Technology (TIFF/IT)") have separated documents into continuous tone (CT) pictures and line work (LW), maintaining different resolutions for each and applying different compression techniques to each (JPEG and run length encoding, respectively). The links between the two image planes are found in the LW channel.

U.S. Pat. No. 5,225,911 to Buckley et al. uses similar encodings but replaced the LW channel with several data streams including mask, color, and rendering tags.

Compressed image printing has been used for over a decade for binary images using one of several standard or proprietary formats: CCITT, JBIG, Xerox Adaptive (Raster Encoding Standard, as discussed in Buckley, Interpress. These single plan compression schemes are lossless and, although often quite effective (20:1) can, for some images, give little or no compression.

U.S. patent application Ser. No. 09/206,487 also separates the image into two planes, but each plane is completely sent. Three data streams are used (two image planes and a separation mask) and no mechanism exists to control local data rate.

JPEG is a standard for compressing continuous tone images. The acronym stands for Joint Photographic Experts Group. JPEG is divided into a baseline system that offers a limited set of capabilities, and a set of optional extended system features. JPEG provides a lossy high-compression image coding/decoding capability. In addition to this lossy coding capability, JPEG incorporates progressive transmission and a lossless scheme as well.

JPEG utilizes a discrete cosine transform (DCT) as part of the encoding process to provide a representation of the image that is more suitable to lossy compression. The DCT transforms the image from a spatial representation to a frequency representation. Once in the frequency domain, the coefficients are quantized to achieve compression. A lossless encoding is used after quantization to further improve compression performance. The decoder executes the inverse operations to reconstruct the image.

Dictionary based compression methods use the principle of replacing substrings in a data stream with a codeword that identifies that substring in a dictionary. This dictionary can be static if knowledge of the input stream and statistics are known or can be adaptive. Adaptive dictionary schemes are better at handling data streams where the statistics are not known or vary.

Many adaptive dictionary coders are based on two related techniques developed by Ziv and Lempel. The two methods are often referred to as LZ77 (or LZ1) and LZ78 (or LZ2). Both methods use a simple approach to achieve adaptive compression. A substring of text is replaced with a pointer to a location where the string has occurred previously. Thus the dictionary is all or a portion of the input stream that has been processed previously. Using the previous strings from the input stream often makes a good choice for the dictionary, as substrings that have occurred will likely reoccur. The other advantage to this scheme is that the dictionary is transmitted essentially at no cost as the decoder can generate the dictionary from the previously coded input stream. The many variations of LZ coding differ primarily in how the pointers are represented and what the pointers are allowed to refer to.

LZ1 is a relatively easy to implement version of a dictionary coder. The dictionary in this case is a sliding window containing the previous data from the input stream. The encoder searches this window for the longest match to the current substring in the input stream. Searching can be accelerated by indexing prior substrings with a tree, hash table, or binary search tree. Decoding for LZ1 is very fast in that each code word is an array lookup and a length to copy to the output (uncoded) data stream.

In contrast to LZ1, where pointers can refer to any substring in the window of prior data, the LZ2 method places restrictions on which substrings can be referenced. However, LZ2 does not have a window to limit how far back substrings can be referenced. This avoids the inefficiency of having more than one coded representation for the same string that can occur frequently in LZ1.

LZ2 builds the dictionary by matching the current substring from the input stream to a dictionary that is stored. This stored dictionary is adaptively generated based on the contents of the input stream. As each input substring is searched in the dictionary, the longest match will be located, but starting at the current symbol in the input stream. So if the character "a" was the first part of a substring, then only substrings that started with "a" would be searched. Generally this leads to a good match of input substring to substrings in the dictionary. However, if a substring "bacdef" were in the dictionary, then "acdef" from the input stream would not match this entry since the substring in the dictionary starts with "b". This is different from LZ1, which is allowed to generate a best match anywhere in the window and could generate a pointer to "acdef".

U.S. Pat. No. 5,479,587 discloses a print buffer minimization method in which the raster data is compressed by trying different compression procedures with increasing compression ratios until the raster data is compressed sufficiently to fit in a given print buffer. Each time, a compression procedure with a higher compression ratio is selected from a predefined repertoire of such procedures, ranging from lossless ones such as run-length encoding to lossy ones. Generally, lossless encoding is efficient on text and line art data while lossy encoding is effective on image data. However, this method may produce poor print quality when the nature of the raster page calls for lossy compression in order to achieve a predetermined compression ratio. This is because only one of the selected compression procedure is summarily applied across each strip of the page and when the strip contains both image data as well as text or line art data, the lossy compression procedure will generally blur sharp lines that usually delineate text or line art data or may introduce undesirable artifacts.

European Patent Publication No. 0597571 discloses a method in which the types of objects in a page are first extracted and the boundary of each object determined before rasterization. Appropriate compression procedures are selectively applied to each type of objects. In this way, lossless compression procedures may optimally be applied to text or line art objects while lossy compression procedures may be applied to image objects. The method operates at the display list level that is an intermediate form between the page description file and the rasterized page. Objects and their types are determined by parsing from the high-level, implicitly object-defining commands of the PDL in the display list. This requires knowledge of the particular brand and version of PDL commands as well as how to reconstruct a certain object from these implicit manifestations. In any case, it appears that all but the simplest boundaries such as objects enclosed in rectangular blocks are practically determinable from such deciphering at the display list level.

U.S. Pat. No. 5,982,937 discloses a hybrid lossless/lossy compression process whereby a page of raster data is analyzed to distinguish text or line art objects from image or photo objects. This is accomplished by a procedure that analyzes and recognizes structures in the raster data in the form of color patches. A patch is regarded as a spread of connected pixels of the same color. Once the patches are recognized, they are discriminated between a Type 1 or a Type 2 patch, depending on whether or not the patch can be efficiently compressed by the first type of compression procedure (typically Run Length Lossless Encoding). Each patch has a size measured by the number of pixels therein ("PatchPixelCount"). Type 1 patch has a PatchPixelCount greater or equal to a predetermined number, D1, and Type 2 patch has a PatchPixelCount less than D1. In a preferred implementation, D1 is from 6 to 8. The first (lossless) compression procedure is then applied to Type 1 patches and the second compression procedure (typically JPEG lossy) is applied to Type 2 patches. Thus, appropriate compression procedures are applied to each type of data to optimally attain efficient compression while maintaining quality.

The references described herein and above are incorporated by reference for their teachings.

SUMMARY OF THE INVENTION

In accordance with the invention, there is provided a method and apparatus for compressing and decompressing electronic documents, with maximum intradocument independence, and maximum flexibility in optimization of compression modes.

In accordance with one aspect of the invention, there is provided a method of compressing a received document, comprising: receiving documents containing unknown combinations of a plural data types, including combinations of scanned data, computer rendered data, compressed data and/or rendering tags; dividing the received image into strips of blocks determining from the image itself, which data types are present in each block; compressing data of each data type present in each block with a compression method optimized for its data type. The described method further provides that scanned data may be further segmented into plural scanned data types, and each data type is compressed in said compressing data step with a compression method optimized for said scanned image data type. The described method may also provide that where a received data type is compressed data, the process may include the additional functions of determining a compression ratio thereof, and accepting the compressed data for use, or decompressing and recompressing the data, based on acceptability of said compression ratio determination. The deectibed method may also provide that where some or all of a received data type is pre-determined, the process may use this information to select a compression method for this data type.

In accordance with another aspect of the invention, there is provided a method of compressing received documents including: receiving documents containing unknown combinations of a plural data types, including combinations of scanned data, computer rendered data, compressed data and/or rendering tags; classifying each data type present in the received document; determining optimum compression of each data type present, which may include a non-compressing pass through of compressed data; and from said optimum compression determination, generating a decompression instruction stream, useful in decompression of the document, and which includes decompression instructions and document data.

In accordance with still another aspect of the present invention, there is provided a data structure, for describing a compressed document including unknown combinations of plural data types, including combinations of scanned data, computer rendered data, compressed data and/or rendering tags, comprising: segregation of data in accordance with compression methods thereof; and segregation of data into independent block and strip document portions, whereby each block document portion and each strip document portion may be decompressed without reference to any other block and strip, respectively.

These and other aspects of the invention will become apparent from the following descriptions to illustrate a preferred embodiment of the invention read in conjunction with the accompanying drawings in which.

Figure 5:
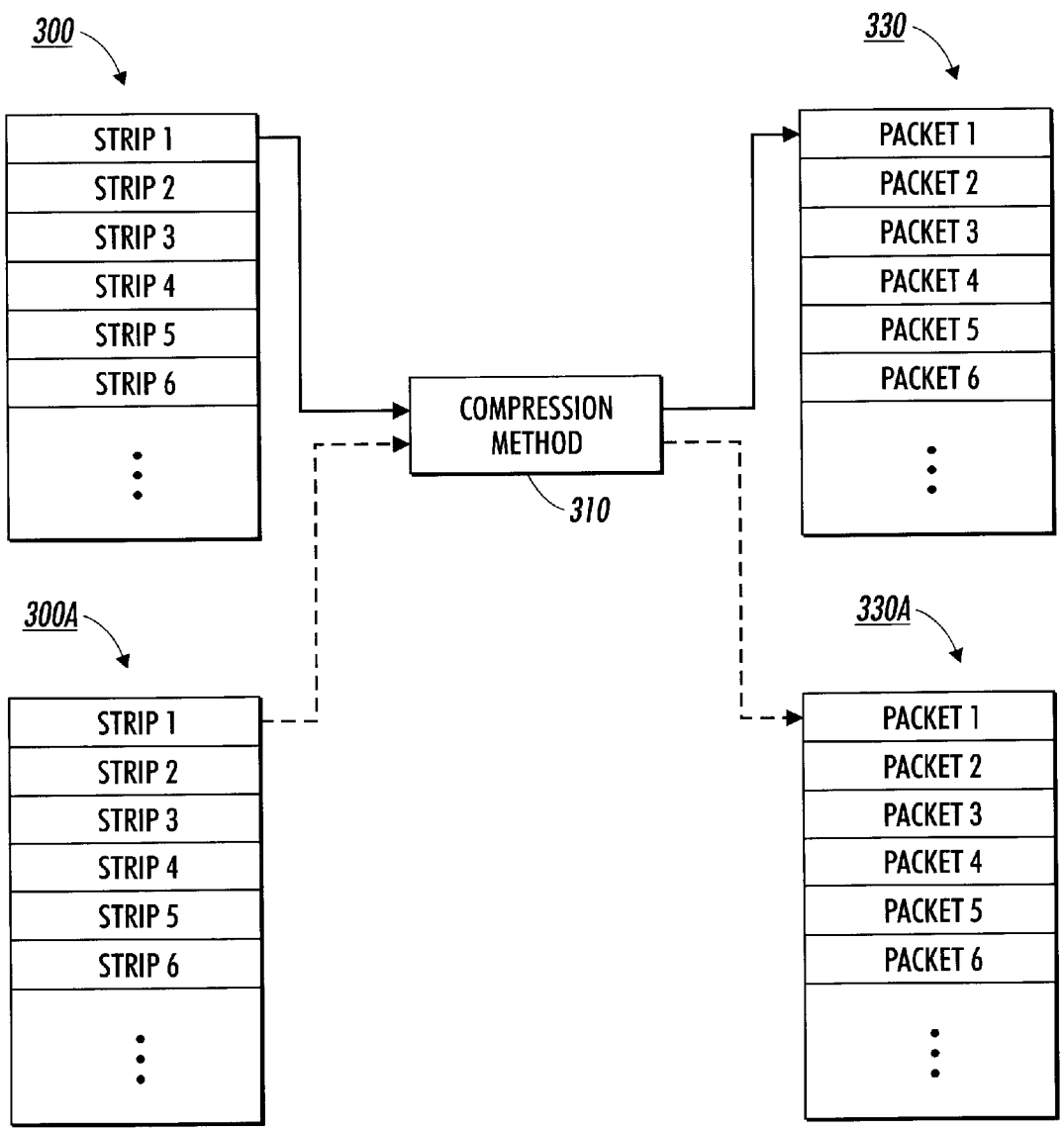
Figure 6:
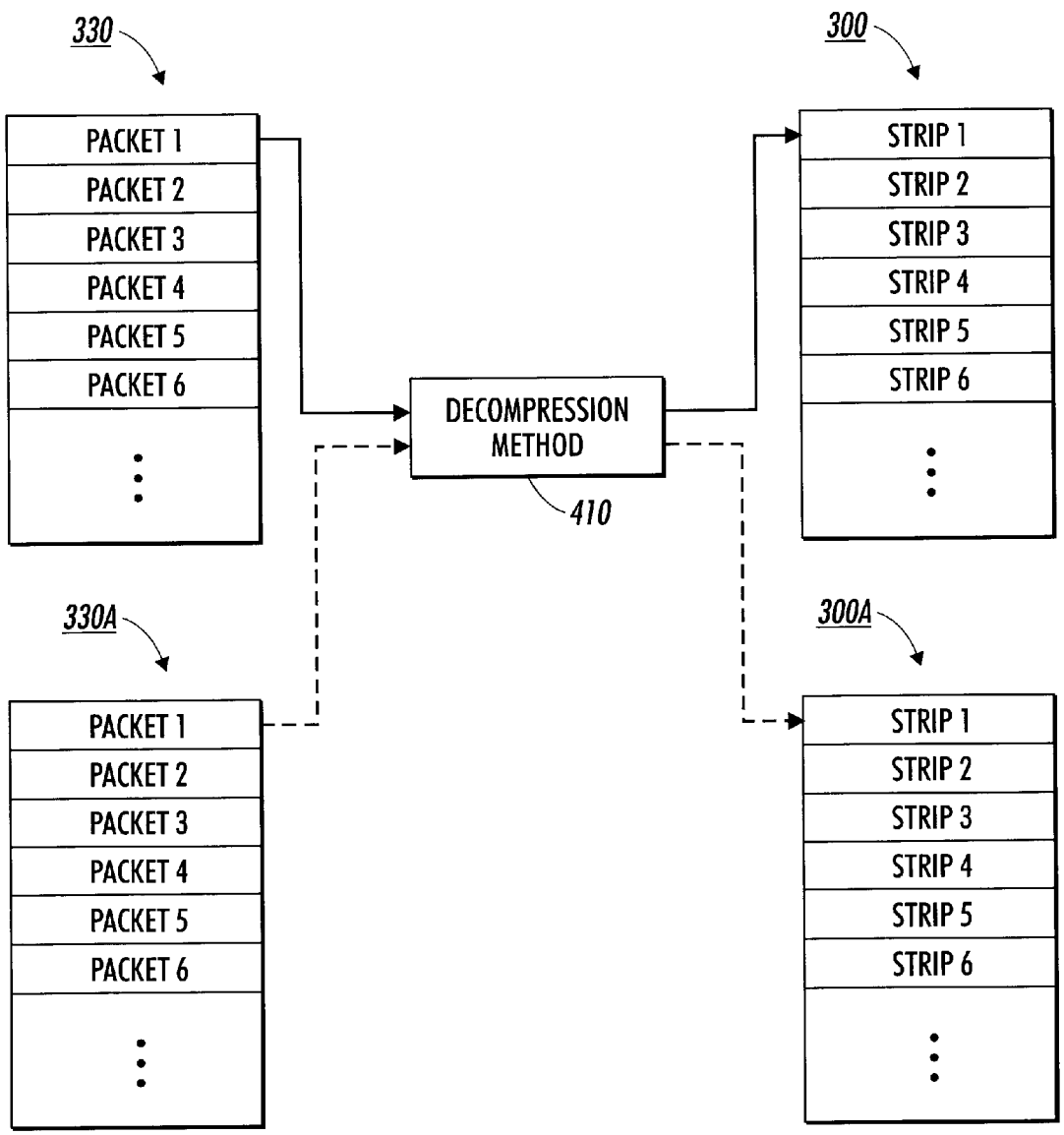
Figure 7:
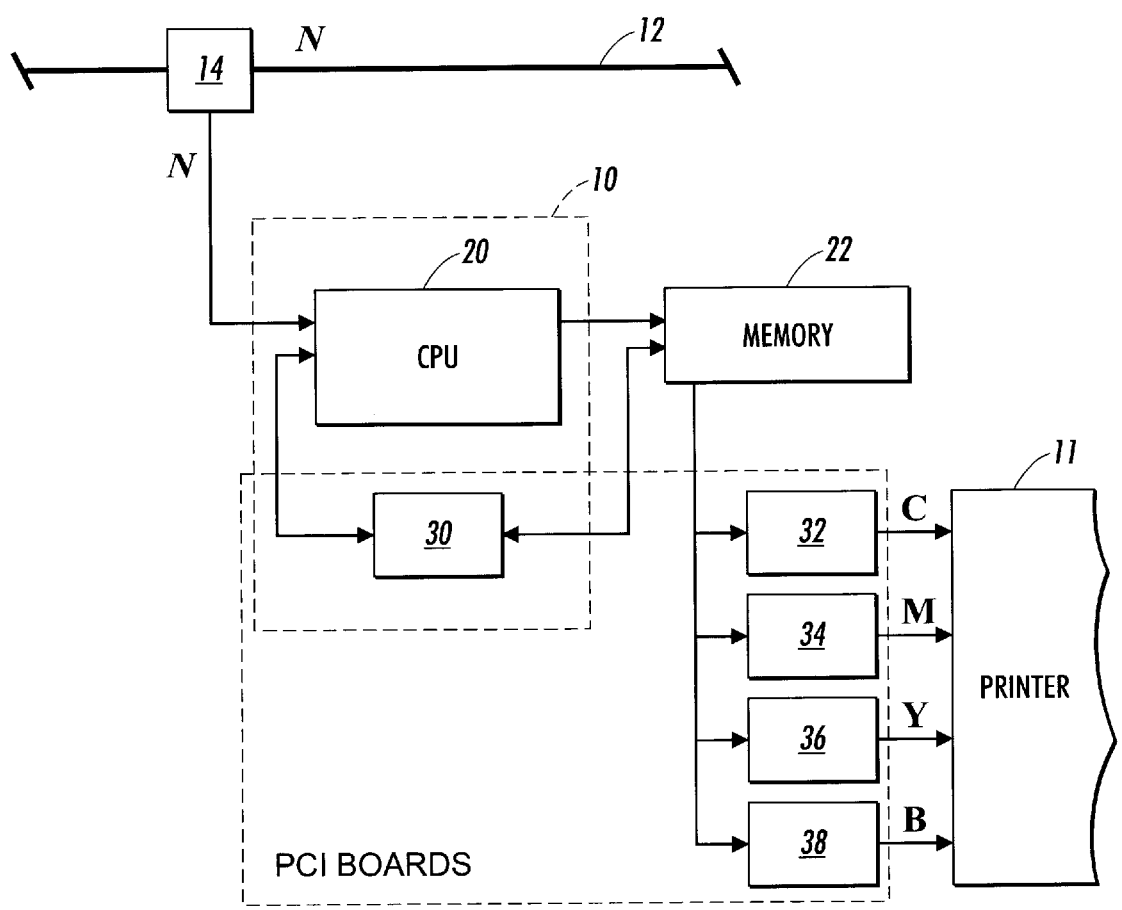

FIGS. 5 and 6 respectively illustrate how the inventive compression and decompression methods described can be time multiplexed so that a plurality of document segments can be compressed independently;

FIG. 7 shows a system in which the present invention may find application.

Referring now to the drawings where the showings are for the purpose of describing an embodiment of the invention and not for limiting same. FIG. 7 illustrates a "digital front end" or DFE, a printer controller 10 that controls document and image flow into a printer 11. It is commonly attached to a network 12, via a network connection 14. The printer controller includes a processing unit (CPU) 20, which could be embodied by a computer workstation, or similar computing/control processor. CPU 20 has access to a document memory 22, which may be integral with controller 10, or separate. CPU 20 has associated with it a large number of PCI boards, which, in accordance with the invention, provide communication interface with external devices, including, in this case, a printer 11 and the memory 22. The PCI boards include the inventive compression system 30 and decompression systems 32, 34, 36 and 38 described herein. Generally, document describing-data received at the CPU 20 or memory 22 is directed through the compression system 30, for storage or processing. Document describing data stored at memory 22 can be directed through decompression systems 32, 34, 36, and 38 directed to each separation channel of a printer. Of course, there are many ways to provide the same data capabilities using the present invention, and this example is merely one possible choice.

Figure 1:
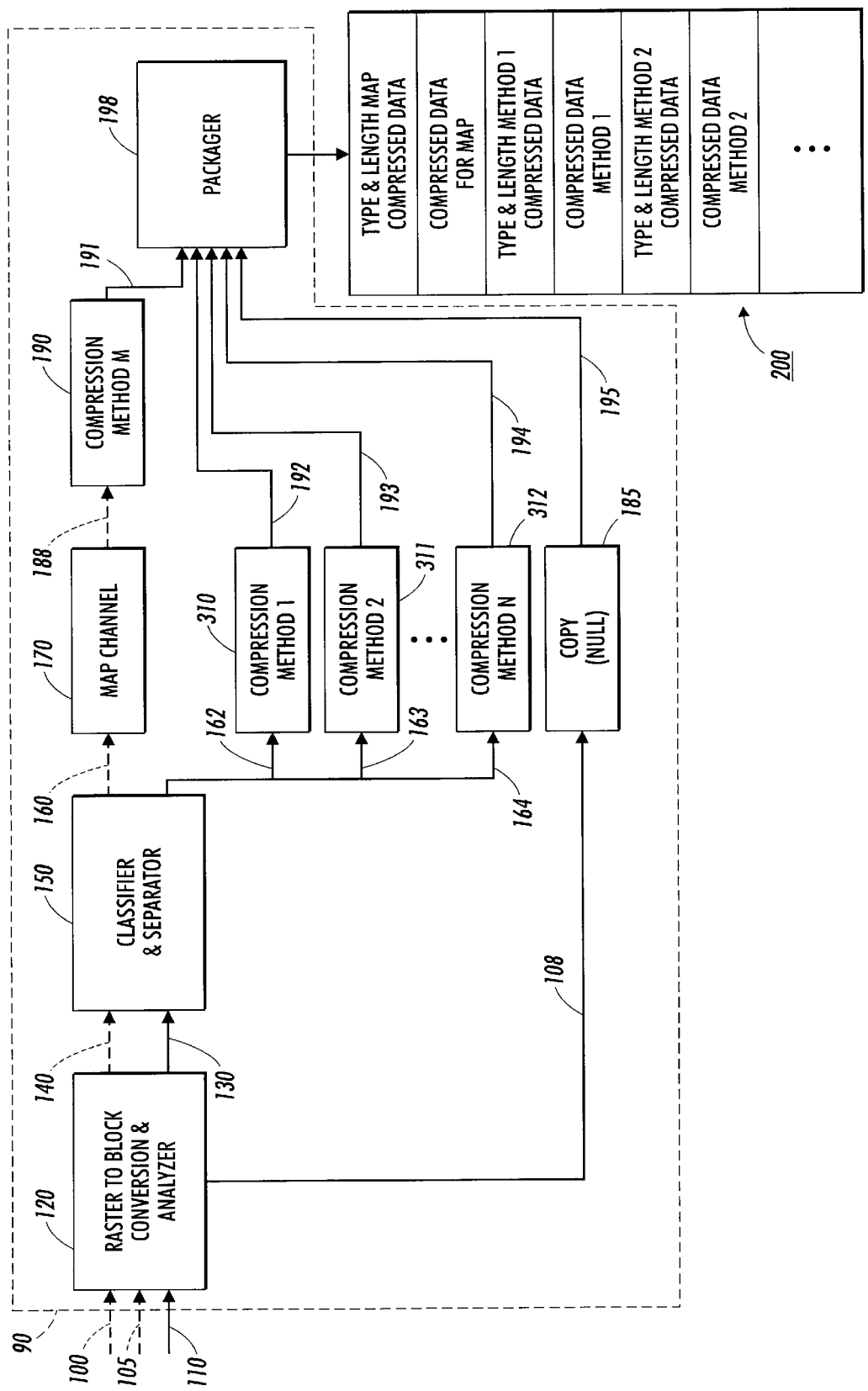
FIG. 1 illustrates the inventive compression method.

FIG. 1 shows a diagram of the functions of the invention. Input to the compression system 90 are optional control tags 100, rendering tags 105, and contone raster data 110. The data is organized to contain a strip of multiple scan lines (8 for example). Input raster data 110 may be pre-compressed as part of the raster generation stage of a printing system. If this compression method meets the compression goals for a strip, then the compressed strip is sent directly to the packager 800 via bypass path 108 for formatting into the output stream. One feature of this invention is the support at the decompression step for this type of by-pass operation.

In the case where the pre-compressed data does not meet compression goals, raster to block conversion and analysis is done at block 120. Control tags at 100 contain information about the classification of the raster pixel data. Control information can be obtained from higher level, structured descriptions of the document that when parsed can identify areas of the document as computer rendered or scanned. This information only controls one type of compression in this invention, selection of a lossless compression. The invention takes advantage of these control tags to direct the compression of a block of data, but does not require the control information to successfully compress the block. In this way, the invention handles a wide range of methods to generate image data that may or may not contain information about the image data useful for selection of compression methods. In this case, the input raster data may be pre-separated to simplify the use of more than on compression method on a single block.

Compression of the rendering tags 105 is provided by the invention. The rendering tags are an additional raster plane or several bits/pixel that accompany contone data, characterizing the type of object to which a pixel belongs. The rendering tags contain information so that better rendering decisions may be made at print/display time.

The raster to block analyzer 120 is a raster-based processor that runs several processes to collect information about the raster data. To simplify the implementation, the analyzer has been restricted to work on fixed size blocks of pixels. Variable sized blocks are also possible.

The classifier/separator 150 takes control information 140 and raster information 130 from the analyzer in block format. Based on this information, classifier/separator 150 executes a decision tree that selects the best compression method for the class of raster data. Classifier separator also separates the raster data into data types 162, 163, 164, and delivers the raster data to one of several compression processors 310, 311 and 312, respectively, each of which implement a compression process optimized for the data type. In order to decompress this multi-channel data stream, a map channel generator 170 is created from control information 160 received from classifier separator 150. This map channel generates signals 188 information for each block on which compression method was used, and in the case of several methods, a pixel-by-pixel map that can be used to re-combine a block.

There are a large number of analyzer and classifier systems that could be employed in the present invention. The analyzer and classifier systems described in U.S. patent application Ser. No. 09/562,143 by Zeck et al., filed May 1, 2000, may be used and are incorporated herein by reference for their teachings.

Some unique features of this part of the invention are the independence of the blocks for analysis and classification and the ability to use multiple compression methods with-in a block (i.e., plural image types within a single block). This feature of the invention enables control of image quality by selecting different compression methods, each with a different degree of information loss, based on the analysis and classification.

In addition to control of image quality in the case of lossy compression methods, the processes for the analyzer and classifier are designed such that each block can be processed independently. This enables parallelism in the implementation for these two functions.

A third unique feature is the ability to compress the blocks with more than one compression method and then select and re-combine the block with the decompression operation. In this way a portion of the block can be compressed lossless and a portion lossy. An aspect of this invention allows blocks containing a plurality of data types to be represented as separate blocks that have not been merged into one block as would generally occur in a printing system described in FIG. 7. This technique also solves the problem of how to treat the pixels in the lossy block that are not to be compressed with the lossy method. With transform methods, removing the pixels of the block creates and edge that will effect image quality by generating "ringing" on the edge. This method allows the pixels in the block to remain avoiding the creation of the artificial edge and keeps the natural structure of the image. This natural structure will generally compress well with transform coding.

The map channel 170 is additional information that must be created and passed to the decompressor in order to re-combine the data correctly. The information in the map channel is often highly correlated such that a dictionary based compression process will achieve good compression for this channel. Additionally, the map channel encodes constant blocks eliminating the need to compress those blocks with one of the compression methods. This yields good compression and improves implementation performance in most cases. As an example, performance is improved in implementations by not having to compress the constant blocks. A constant block occurs wherever a block has a uniform response across it, such as, for example a single color. The compression method M 190 for the map channel 170 would be a lossless compression method, such as LZ1. Loss in this channel would not allow the decompression implementation to work properly.

The last step in the process is to package the compressed data stream at packager 198. In accordance with another aspect of the invention, the packager takes the output of each compressor 191, 192, 193, 194, and pass through 195 and organizes the data into a "packet" 200. This packet contains the compressed data for a strip of blocks, in a format self-contained or independent from adjacent a data blocks, and efficiently separated into compact elements such as compressed data, tags and map. The packet is formatted as in packet 200, with a type and length field and the compressed data. Other formatting structures could also be used that store a type and length field so that the packet can be easily separated into components at the decompressor.

A unique feature of this method is strip independence. Each strip can be compressed separately and decompressed separately. This feature of the invention allows scaling of the performance by replicating implementations of the compressor, so that each instance operates on a strip as in FIG. 2.

Decompression is accomplished by using the type and length fields in packet 200 to separate out the compressed data. Decompression of the map data is done and used to direction re-combination of the blocks.

The inventive compression method is optimized for continuous tone images, typically eight bits/pixel/color. However, binary data can also be compressed by using the map channel 170 information to select pixels from one of two compression methods. Each compression method compresses either a black or white block. By selecting between the two methods, binary or contone data can be compressed with this method. Most compression methods that are designed to work on contone data do not operate well on binary pixel data. In this way, this invention can be used for both contone and binary pixel data. Since the two compression methods are compressing constant blocks, the compression is high.

Figure 2:
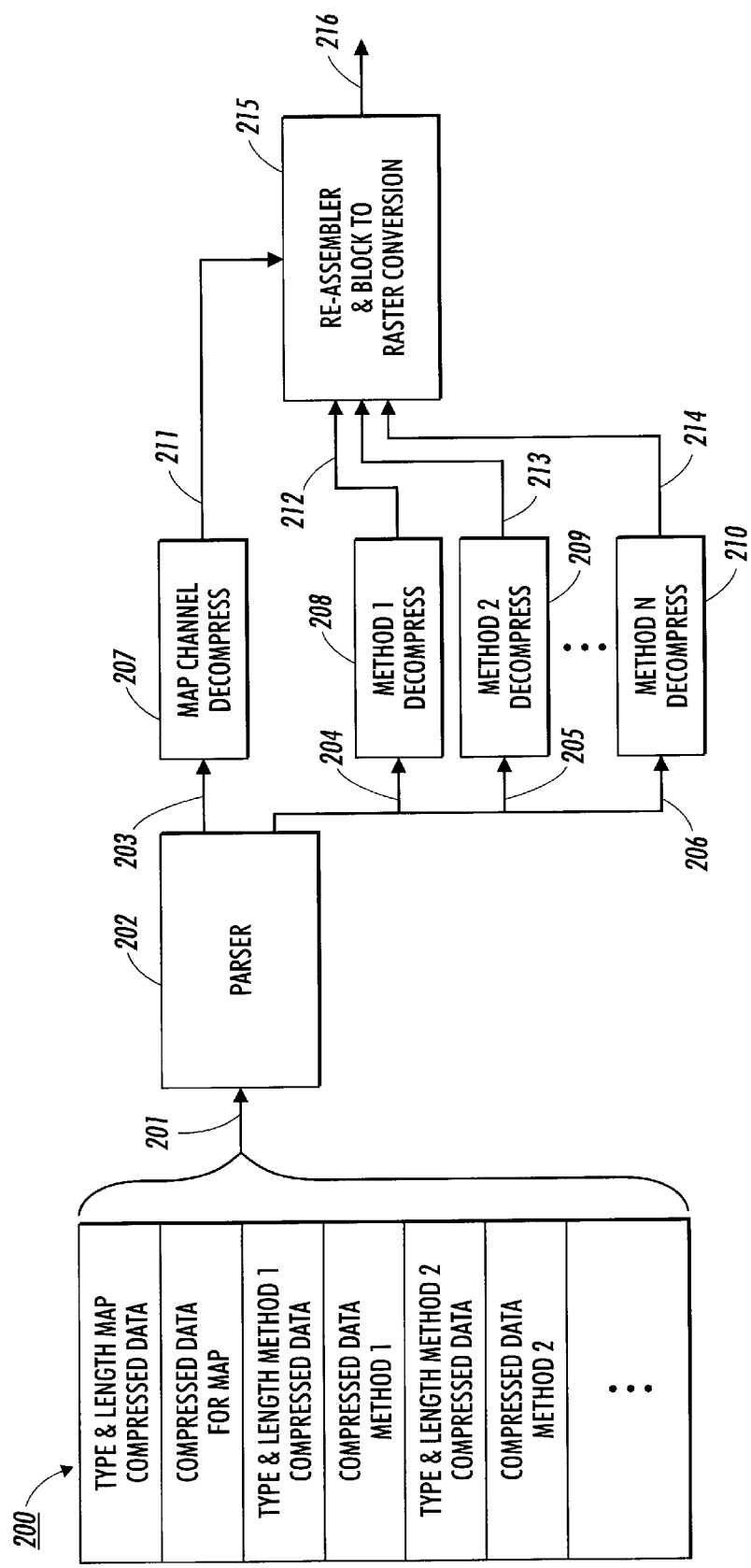
FIG. 2 illustrates the inventive data structure, generated by the compression method of FIG. 1, and its use in decompression.

FIG. 2 shows the method used for decompression. From this figure it is clear how the map channel information is key to indicate to the decompression step how to re-assemble the blocks from packet 200. The design of the data structure of packet 200, passing data through channel 201 allows the parser 202 to separate out the different compressed segments and deliver the segments to each decompression method 203, 204, 205, 206. The map channel is decompressed by a lossless decompression method 207 that is the inverse of the method used in the compression implementation. This information on line 211 is given to the re-assembler 215. The re-assembler can then determine which of the compression methods to chose on a block-by-block basis via lines 212, 213, 214, to regenerate the raster strip. In the case of mixed blocks, the map channel contains a pixel by pixel selector for the block that enables the re-assembler to merge the two blocks together. In the case of constant blocks, the map channel contains all the information for the re-assembler to regenerate a block. Re-assembler 215 also can convert the block ordered data back to raster order depending on the compression method. In the case of pre-compressed strips, that would pass through the copy function FIG. 1, 185 the data does not need to be block ordered. For example, run length compression is a preferred embodiment of this aspect of the invention and is not always block ordered. The re-assembler directs the compressed data outward 216, for example to memory, a printing devices as in FIG. 7, or further processing.

Figure 3:
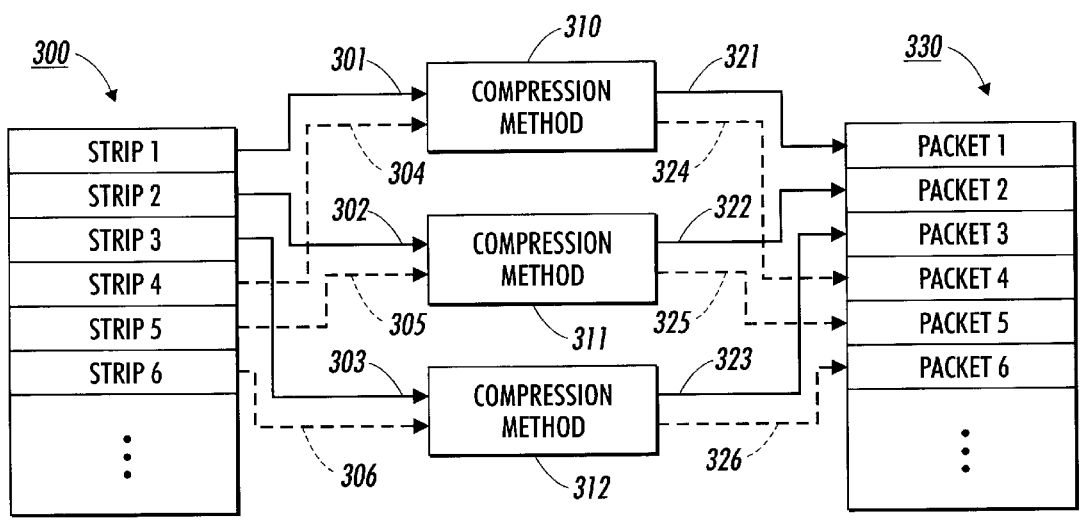
FIGS. 3 and 4 illustrates strip and block independence and its advantage with respect to compression of multiple data types.

FIG. 3 shows a unique feature of this method that enables parallel implementation for performance scaling. Strips of scan lines 300, the number of which matches the height of the block size, are given to replicate instances of the compression system of the invention, 310, 311, 312. The strips are processed in an order such that a strip is given to each instance 301, 302, 303 and then each repeated instance 304, 305, 306 when the first strips are completed for sequential processing down a page. In this example three instances of the compression system of the invention are chosen, but the invention scales with any number of instances. Likewise, the output stream is produced, respectively from compression systems 310, 311 and 312, in order 321, 322, 323 and repeated for 324, 325, 326. The output stream is assembled in order 330 so the decompressor can re-assemble the strips. As an example, this type of parallelism could be implemented completely in hardware or with a multi-processor system, each processor implementing one instance of the invention.

Figure 4:
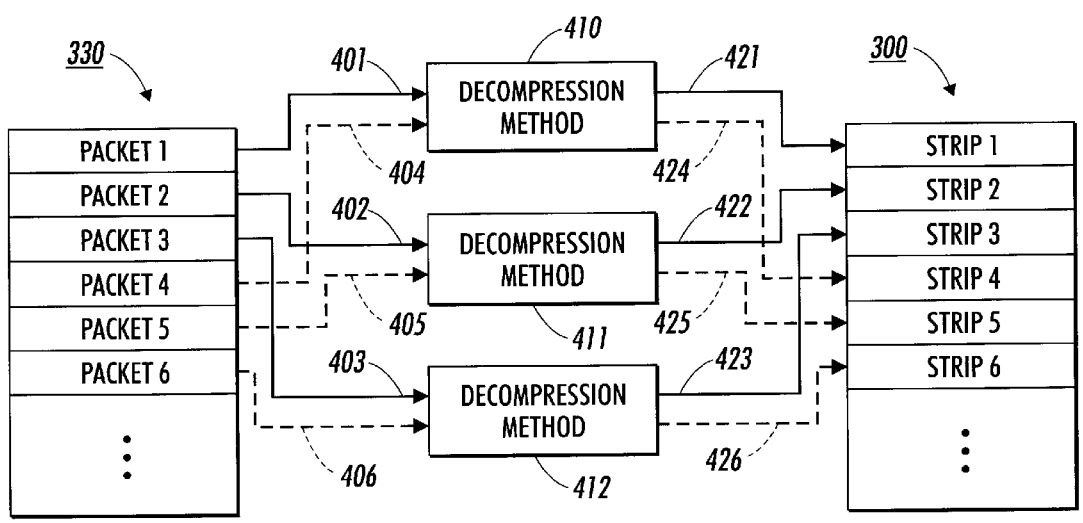

FIG. 4 is showing how the decompression can be scaled in performance in the same way. In this case the compressed packets 330 are processed in order 401, 402, 403 to the decompressor systems 410, 411 and 412. When the first packets have been decompressed, another set 404, 405, 406 is given to the decompressors systems. The resulting strips of scan lines are stored in order on the output of the system in format 300. In this example three instances of the decompression system of the invention are chosen, but the invention scales with any number of instances. Likewise, the output stream is produced, respectively from decompression systems 410, 411 and 412, in order 421, 422, 423 and repeated for 424, 425, 426. The output stream is assembled in order 300.

For one possible embodiment and with reference to FIG. 1, the input data 110 is contone, 8 bits per pixel organized by the raster to block analyzer 120 as 8×8 blocks of pixels. Control 100 is a single bit that indicates if a computer graphics process has rendered the data 110 or if the data comes from a light sensitive sensor array such as a digital camera or a scanner. Multibit control signals are possible to meet the required identification.

Pixel data that is computer rendered bypasses the analyzer and is classified by the control bit alone and assigned to be compressed by a lossless compression process 310. One of two processes are used, run-length or an LZ1 dictionary compression method at block 310

For data received in a compressed formation, if compression goals are met, then the run-length data is just copied to the output packager 198 through the NULL compression method 185.

The data that is not computer rendered or has an unknown source is given to the analyzer 120. The classifier/separator 150 decides, based on information from the analyzer, if the block should be sent to the LZ1 lossless compressor, to one of several JPEG compressors, or should be handled as a mixed block. Several JPEG compressors are used with different quantization tables to enable better control of image quality and compression.

Mixed blocks, where input data containing at least two data types at 110 have not been merged into a single block, are sent to two compression methods and the map channel contains a pixel by pixel selector to indicate how to assemble the block at the decompressor. The map channel is compressed by a LZ1 compression method as well.

FIG. 5 is showing how the compression method can be time multiplexed so that a plurality of document segments can be compressed independently. Each document segment can be a portion of a page, a color separation or a full page of a document as an example. Strips 1,2, . . . 6 from one document segment 300 are directed to compression system 310. The output of the compression for this strip is stored in the packet list 330. Next a strip from another document segment 300A are given to the compression method 310.

The output of the compression operation is stored in the packet list 330A. This process can be repeated for all the document segments. This feature is useful where there are multiple sources generating the strips for multiple pages and this process is slower than the compression implementation. An example of this is in a printing system where multiple processors are being used to render several document segments. Each segment can take a long time to generate such that if the implementation of the compression method were operating on only one document segment, the resources of compression implementation would be under utilized. Any sequencing of the input strips can be supported as long as the input and output order are maintained.

FIG. 6 shows how the same method in FIG. 5 can be applied to decompression. In this case the single decompressor is given packets 1 . . . 6 of compressed data from a plurality of compressed packet lists 330 and 330A. The first packet from 330 is decompressed by the decompression system 410 and the output is stored in the strip storage 300. The first packet from 330A is then given to the decompressor and the output is stored in the strip storage 300A. The process is repeated. The application of this feature of the invention is in the case where the decompression implementation is faster than the process that is using the strip outputs 300, 300A. This enables the resources of a single decompression implementation to be used to decompress multiple document segments. Each document segment can be a portion of a page, a color separation or a full page of a document as an example. Any sequencing of the input compressed packets can be supported as long as the input and output order is synchronized and stored in the corresponding order.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware, or combinations there of, is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

What is claimed is:

1. A method of compressing a received document, comprising:
   receiving documents containing an unknown combination of a plural data types, said combination including scanned data, computer rendered data, compressed data and/or rendering tags;
   segmenting the received image into strips of blocks; and
   performing operations upon each block independently of other blocks, the operations including:
   a. determining, from the image itself, at least one data type present in each block,
   b. classifying each block according to its at least one data type, and
   c. compressing data of each data type present in each classified block with a compression method optimized for the respective data type.

2. A method as described in claim 1, wherein scanned data is further segmented into a plurality of scanned data types, and each of said data types is compressed with a compression method optimized for said scanned image data type.

3. A method as described in claim 1, wherein for received compressed data,
   determining a compression ratio thereof, and
   accepting the compressed data for use as, or decompressing and recompressing the data, based on acceptability of said compression ratio determination.

4. A method of compressing received documents including:
   receiving documents containing unknown combinations of a plural data types, including combinations of scanned data, computer rendered data, compressed data and/or rendering tags;
   classifying each data type present in the received document;
   determining optimum compression of each data type present, which may include a non-compressing pass through of compressed data;
   segmenting an image of the received document into strips of blocks and performing operations upon each block independently of other blocks, the operations including:
   a. determining from the image itself, at least one data type present in each block,
   b. classifying each block according to its at least one data type, and
   c. compressing data of each data type present in each classified block with a compression method optimized for the respective data type:
       and from said optimum compression determination, generating a decompression instruction stream, useful in decompression of the document, and which includes decompression instructions and document data.

* * * * *